(12) United States Patent
Fang et al.

(10) Patent No.: US 11,460,945 B2
(45) Date of Patent: Oct. 4, 2022

(54) ELECTRONIC DEVICE

(71) Applicants: Hsin-Chieh Fang, Taipei (TW);
Wang-Hung Yeh, Taipei (TW);
Shu-Hung Lin, Taipei (TW)

(72) Inventors: Hsin-Chieh Fang, Taipei (TW);
Wang-Hung Yeh, Taipei (TW);
Shu-Hung Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/198,209

(22) Filed: Mar. 10, 2021

(65) Prior Publication Data
US 2021/0405805 A1   Dec. 30, 2021

(30) Foreign Application Priority Data
Jun. 24, 2020  (TW) .................... 109121470

(51) Int. Cl.
| | |
|---|---|
| *G06F 3/041* | (2006.01) |
| *G09G 3/34* | (2006.01) |
| *G06F 3/046* | (2006.01) |
| G06F 3/04886 | (2022.01) |

(52) U.S. Cl.
CPC ............ *G06F 3/0416* (2013.01); *G06F 3/046* (2013.01); *G09G 3/342* (2013.01); *G06F 3/04886* (2013.01); *G09G 2354/00* (2013.01)

(58) Field of Classification Search
CPC .... G06F 3/0416; G06F 3/046; G06F 3/04886; G06F 1/169; G06F 3/0213; G06F 3/03547; G09G 3/342; G09G 2354/00
See application file for complete search history.

(56) References Cited

U.S. PATENT DOCUMENTS

| | | | |
|---|---|---|---|
| 7,834,855 B2 | 11/2010 | Hotelling et al. | |
| 11,231,768 B1 * | 1/2022 | Cheng | ................. G06F 1/3262 |

(Continued)

FOREIGN PATENT DOCUMENTS

| | | |
|---|---|---|
| CN | 111158496 | 5/2020 |
| TW | M451588 | 4/2013 |

(Continued)

OTHER PUBLICATIONS

"Office Action of Taiwan Counterpart Application", dated Aug. 30, 2021, p. 1-p. 6.

*Primary Examiner* — Ibrahim A Khan
(74) *Attorney, Agent, or Firm* — JCIPRNET

(57) ABSTRACT

An electronic device including a body, a controller, a first touch layer and a second touch layer is provided. The body includes a first operating region and a second operating region. The second operating region is divided into a first touch region, a second touch region and a third touch region located between the first touch region and the second touch region. The controller, the first touch layer and the second touch layer are disposed in the body, and the first touch layer and the second touch layer are electrically coupled to the controller. In a first mode, the controller controls the first touch layer to switch from a detection status to a working status. In a second mode, the controller controls the second touch layer to switch from the detection status to the working status. A control method of an electronic device is also provided.

9 Claims, 6 Drawing Sheets

(56) References Cited

U.S. PATENT DOCUMENTS

| | | | | |
|---|---|---|---|---|
| 2012/0105361 A1* | 5/2012 | Kremin | ............... | G06F 3/04162 345/174 |
| 2012/0182322 A1* | 7/2012 | Yeh | ..................... | G06F 3/04883 345/173 |
| 2012/0306927 A1* | 12/2012 | Lee | ..................... | G06F 3/03545 345/173 |
| 2014/0198075 A1* | 7/2014 | Yeh | ....................... | G06F 3/0446 345/174 |
| 2014/0354605 A1* | 12/2014 | Kurita | .................. | G06F 1/1626 345/179 |
| 2014/0368455 A1* | 12/2014 | Croisonnier | ............ | G06F 3/045 345/173 |
| 2015/0091859 A1* | 4/2015 | Rosenberg | .......... | G06F 3/03545 345/174 |
| 2015/0185923 A1* | 7/2015 | Yoon | ....................... | G06F 3/044 345/174 |
| 2016/0132145 A1* | 5/2016 | Fourie | ................ | H03K 17/9622 345/174 |
| 2016/0170505 A1* | 6/2016 | Jordan | .................. | G06F 3/0488 345/179 |
| 2017/0091153 A1* | 3/2017 | Thimbleby | ............ | G06F 3/0486 |
| 2018/0032247 A1* | 2/2018 | Itoh | ....................... | G06F 3/0482 |
| 2018/0314377 A1* | 11/2018 | DeBates | ............. | G06F 3/04162 |
| 2019/0034070 A1* | 1/2019 | Singh | ..................... | G06F 1/166 |
| 2019/0094968 A1* | 3/2019 | Wen | ....................... | G06F 3/0445 |
| 2019/0102003 A1* | 4/2019 | Gur | ................... | G06F 3/041661 |

FOREIGN PATENT DOCUMENTS

| | | |
|---|---|---|
| TW | 201327273 | 7/2013 |
| TW | I455004 | 10/2014 |

\* cited by examiner

ELECTRONIC DEVICE

CROSS-REFERENCE TO RELATED APPLICATION

This application claims the priority benefit of Taiwan application serial no. 109121470, filed on Jun. 24, 2020. The entirety of the abovementioned patent application is hereby incorporated by reference herein and made a part of this specification.

BACKGROUND

Technical Field

This disclosure relates to an electronic device, and in particular to an electronic device and a control method thereof.

Description of Related Art

Due to stronger computing power for multitasking and ease of carry by users, notebook computers have become an indispensable tool for modern people. In general, a notebook computer includes a host computer and a display, and the host computer is provided with a keyboard and a touch pad for users to operate the notebook computer. The touch pad is installed in the casing of the host computer, and the casing is provided with a slot corresponding to the touch pad, so that the operation surface of the touch pad is exposed outside of the casing, making it convenient for the user to operate. Therefore, it is difficult to maintain the integrity of the product appearance given the existing touch pad design.

In addition, the peripheral products of notebook computers are constantly being updated in response to the diversified needs of users. Taking the drawing pad as an example, the drawing pad may be connected externally to a notebook computer, and the user may touch, slide, or tap on the drawing pad through a stylus to operate or input information to the notebook computer. However, the drawing pad is difficult to carry or easy to miss, etc.

SUMMARY

The disclosure provides an electronic device with good integration.

The disclosure provides a control method of an electronic device, which helps to improve user convenience during operation.

The disclosure proposes an electronic device, which includes a body, a controller, a first touch layer and a second touch layer. The body has a first operating region and a second operating region arranged side-by-side with the first operating region. The second operating region is divided into a first touch region, a second touch region arranged side-by-side with the first touch region, and a third touch region located between the first touch region and the second touch region. The controller, the first touch layer and the second touch layer are disposed in the body, and the first touch layer and the second touch layer are electrically coupled to the controller. The first touch layer corresponds to the first touch region and the second touch region. The second touch layer corresponds to the first touch region, the second touch region, and the third touch region. In a first mode, the controller controls the first touch layer to switch from a detection status to a working status, and the second touch layer is in the detection status. In a second mode, the controller controls the second touch layer to switch from the detection status to the working status, and the first touch layer is in the detection status.

In an embodiment of the disclosure, the first touch region is configured to receive a touch signal, and the controller controls the first touch layer to switch from the detection status to the working status according to the touch signal. If the first touch region does not receive the touch signal, the controller controls the first touch layer to switch from the working status to the detection status.

In an embodiment of the disclosure, the second touch region is configured to receive a first touch signal or a second touch signal. The controller controls the first touch layer to switch from the detection status to the working status according to the first touch signal, or controls the first touch layer to switch from the working status to the detection status according to the second touch signal.

In an embodiment of the disclosure, the second touch region is divided into a virtual key activation region and a virtual key region. The virtual key activation region is configured to receive the first touch signal or the second touch signal. The controller controls the first touch layer to switch from the detection status to the working status according to the first touch signal, or controls the first touch layer to switch from the working status to the detection status according to the second touch signal.

In an embodiment of the disclosure, any one of the first touch region, the second touch region, and the third touch region is configured to receive an electromagnetic signal. The controller controls the second touch layer to switch from the detection status to the working status according to the electromagnetic signal. If any one of the first touch region, the second touch region and the third touch region does not receive the electromagnetic signal, the controller controls the second touch layer to switch from the working status to the detection status.

In an embodiment of the disclosure, the first touch layer corresponds to the third touch region.

In an embodiment of the disclosure, the electronic device further includes a first ink layer and a second ink layer disposed in the body. The first ink layer is located on the first touch layer. The second ink layer is located between the first touch layer and the second touch layer. The first touch layer is located between the first ink layer and the second ink layer.

In an embodiment of the disclosure, the body includes a first casing and a second casing disposed on the first casing. The first ink layer, the first touch layer, the second ink layer, and the second touch layer are stacked between the second casing and the first casing, and the controller is disposed in the first casing.

In an embodiment of the disclosure, the second casing includes a transparent material, and the first ink layer and the second ink layer each have a first transparent part corresponding to the first touch region and a second transparent part corresponding to the second touch region.

In an embodiment of the disclosure, the electronic device further includes a first backlight and a second backlight. The first backlight and the second backlight are disposed in the body and are electrically coupled to the controller. The first backlight corresponds to the first transparent part of the first ink layer and the first transparent part of the second ink layer. The second backlight corresponds to the second transparent part of the first ink layer and the second transparent part of the second ink layer. In the first mode, the controller enables the first backlight or the second backlight. In the second mode, the controller disables the first backlight and the second backlight.

The disclosure proposes a control method, which is suitable for an electronic device. The electronic device includes a body, a first touch layer, and a second touch layer. The first touch layer and the second touch layer are disposed in the body, and the first touch layer is disposed on the second touch layer. The control method includes the following steps. A touch signal is received by any one of the first touch region and the second touch region of the body, or an electromagnetic signal is received by any one of the first touch region, the second touch region and the third touch region of the body. The first touch layer is switched from a detection status to a working status while the second touch layer is in a detection status when any one of the first touch region and the second touch region of the body receives the touch signal. The second touch layer is switched from the detection status to the working status while the first touch layer is in the detection status when any one of the first touch region, the second touch region and the third touch region of the body receives the electromagnetic signal.

In an embodiment of the disclosure, the second touch region is divided into a virtual key activation region and a virtual key region. The control method further includes the following steps. The first touch layer is switched from the detection status to the working status when the virtual key activation region receives the touch signal. The first touch layer is switched from the working status to the detection status when the virtual key activation region receives another touch signal.

In an embodiment of the disclosure, the electronic device further includes a first backlight and a second backlight, and the first backlight and the second backlight are disposed in the body. The first backlight corresponds to the first touch region, and the second backlight corresponds to the second touch region. The control method further includes the following steps. The first backlight is enabled and the second backlight is disabled when the first touch region of the body receives the touch signal. The first backlight is disabled and the second backlight is enabled when the second touch region of the body receives the touch signal.

Based on the above, in the electronic device of the disclosure, the first touch layer and the second touch layer are integrated in the body, and a surface of the body is divided into multiple virtual touch regions for a user to touch and cause the electronic device to execute a corresponding function or action. Therefore, the electronic device of the disclosure not only has good integration, but also maintains the integrity of the product appearance. Once trigger events occurring in the different virtual touch regions are determined by the controller, the controller controls the first touch layer or the second touch layer to switch from the detection status to the working status, so that the user may use at least one of the several virtual touch regions to operate or input information to the electronic device. Therefore, the electronic device and its control method of the disclosure are quite user-friendly.

To make the aforementioned more comprehensible, several embodiments accompanied by drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
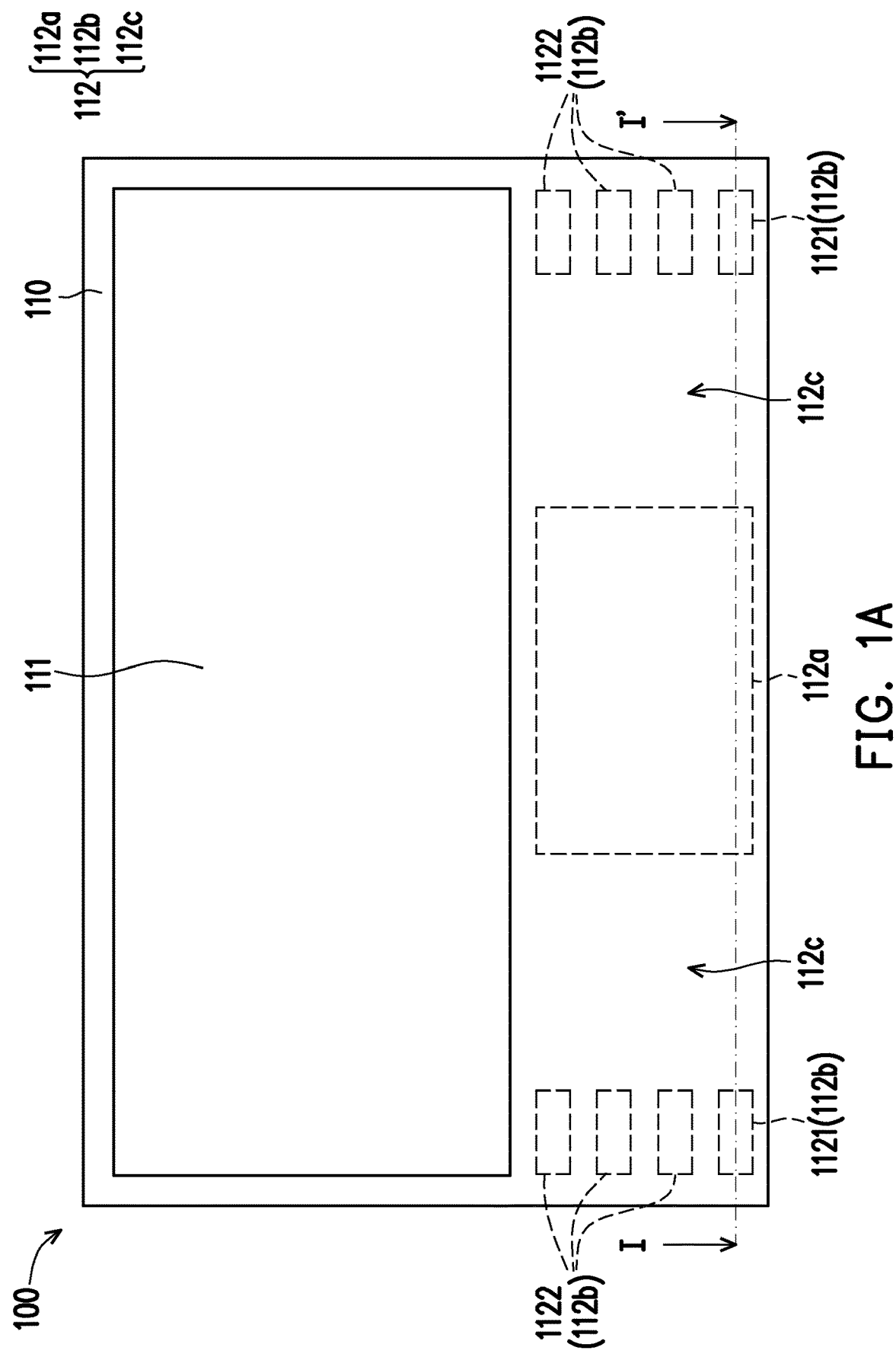
FIG. 1A is a top schematic view of an electronic device according to a first embodiment of the disclosure.

Reference will now be made in detail to the embodiments of the disclosure, examples of which are illustrated in the accompanying drawings. Wherever possible, the same reference numbers are used in the drawings and the description to refer to the same or like parts.

Figure 1B:
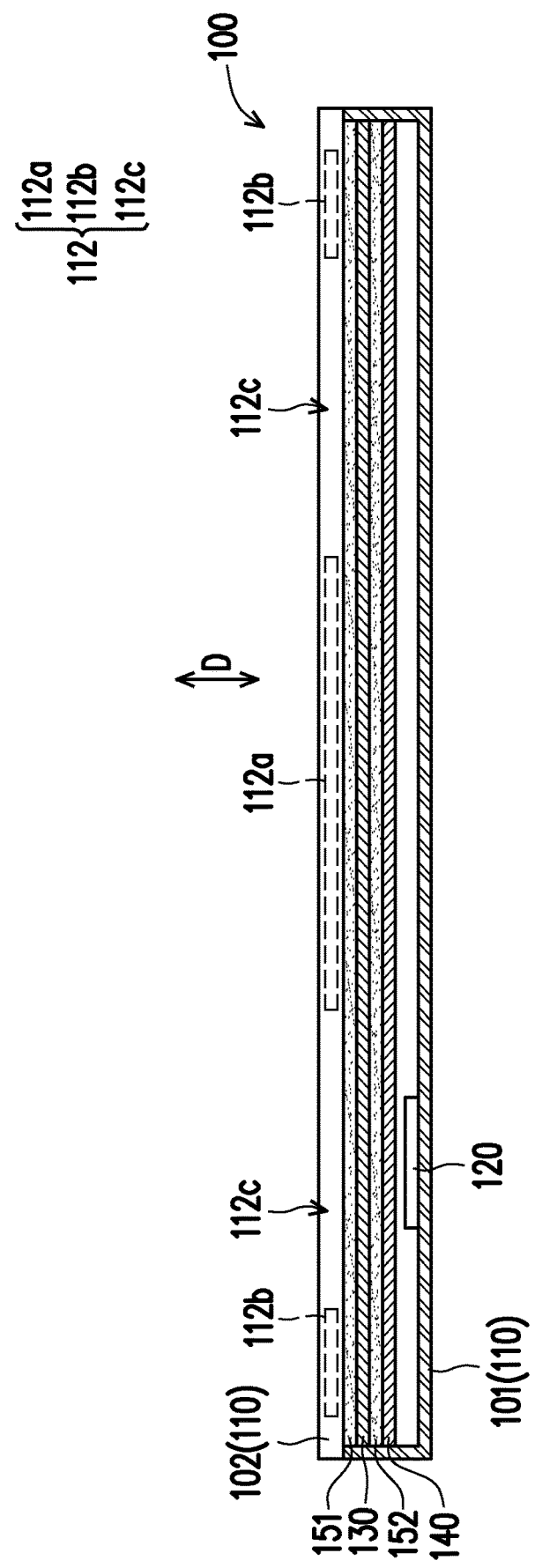
FIG. 1B is a cross-sectional schematic view of FIG. 1A along line I-I'.
Figure 1C:
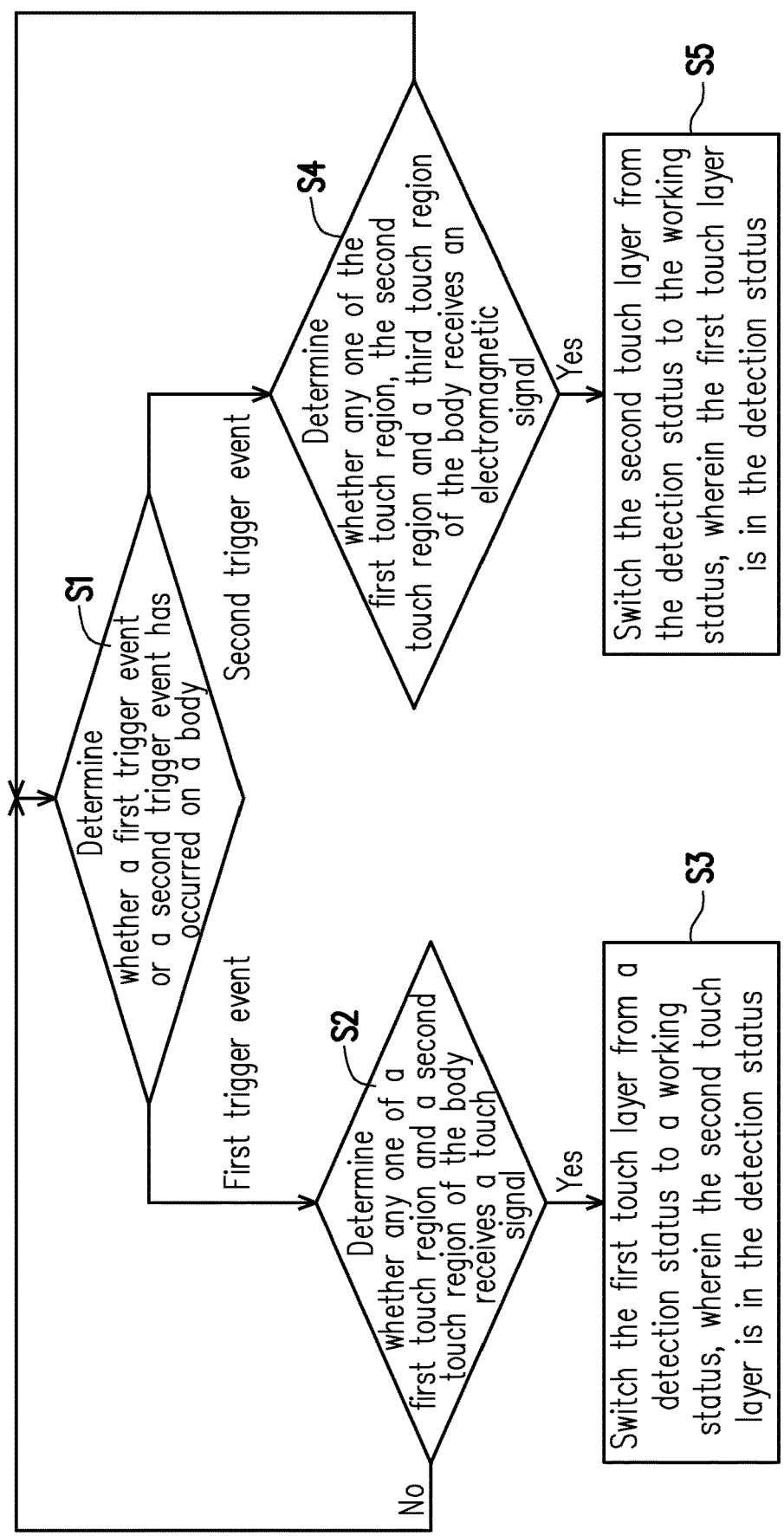
FIG. 1C is a schematic flowchart of a control method of the electronic device according to the first embodiment of the disclosure.

FIG. 1A is a top schematic view of an electronic device according to a first embodiment of the disclosure. FIG. 1B is a cross-sectional schematic view of FIG. 1A along line I-I'. FIG. 1C is a schematic flowchart of a control method of the electronic device according to the first embodiment of the disclosure. With reference to FIG. 1A, in this embodiment, an electronic device 100 may be a part of a notebook computer or an external input device. In an example thereof, the external input device may be a docking station configured to install a smartphone or a tablet on it to allow a user to operate or input information to the smartphone or the tablet through the external input device. In another example, the external input device may be a keyboard.

The electronic device 100 includes a body 110. The body 110 has a first operating region 111 and a second operating region 112, and the first operating region 111 may be a physical keyboard. The first operating region 111 and the second operating region 112 are located on a same surface of the body 110, and the second operating region 112 is arranged side-by-side with the first operating region 111. The second operating region 112 may be a casing surface to maintain the integrity of the product appearance. Furthermore, the second operating region 112 may be divided into multiple virtual touch regions such as a first touch region 112a, a second touch region 112b, and a third touch region 112c. The second touch region 112b is arranged side-by-side with the first touch region 112a, and the third touch region 112c is located between the first touch region 112a and the second touch region 112b. For example, the number of the second touch region 112b is two, the first touch region 112a is located between the two second touch regions 112b, and a region between the first touch region 112a and any one of the second touch regions 112b is the third touch region 112c.

In other embodiments, the number of the second touch regions 112b may be increased or decreased according to design requirements, and the disclosure is not limited thereto.

With reference to FIGS. 1A and 1B, in the embodiment, the electronic device 100 further includes a controller 120, a first touch layer 130, and a second touch layer 140. The controller 120, the first touch layer 130, and the second touch layer 140 are disposed in the body 110, and the first touch layer 130 and the second touch layer 140 are electrically coupled to the controller 120. The controller 120 may be a central processing unit (CPU), other programmable general-purpose or special-purpose microprocessors, a digital signal processor (DSP), a programmable controller, an application specific integrated circuit (ASIC), a programmable logic device (PLD), other similar processing devices, or a combination thereof, and may include a built-in or an external memory.

The first touch layer 130 is disposed on the second touch layer 140, and the first touch layer 130 corresponds to the first touch region 112a, the second touch region 112b, and the third touch region 112c. The first touch layer 130 is configured to sense a trigger event on the second operating region 112, such as a touch, a slide, or a tap of the user's finger on the second operating region 112. The surface area of the first touch layer 130 is substantially equal to the surface area of the second operating region 112, thereby increasing a touch sensing range. The first touch layer 130 may be include a transparent conductive film, such as including a transparent conductive oxide (TCO).

The second touch layer 140 corresponds to the first touch region 112a, the second touch region 112b and the third touch region 112c. In a direction D perpendicular to the surface where the second operating region 112 is located, the first touch layer 130 overlaps the second touch layer 140. The second touch layer 140 is configured to sense the trigger event on the second operating region 112, such as a touch, a slide or a tap of a stylus on the second operating region 112. The surface area of the second touch layer 140 is substantially equal to the surface area of the second operating region 112, thereby increasing the touch sensing range. An electromagnetic induction plate configured to generate electromagnetic interaction with the stylus may be adopted for the second touch layer 140.

Since the first touch layer 130 and the second touch layer 140 are integrated in the body 110, and the surface of the body 110 is divided into multiple virtual touch regions for the user to touch and cause the electronic device 100 to execute a corresponding function or action, the electronic device of the disclosure not only has good integration, but also maintains the integrity of the product appearance.

In this embodiment, the electronic device 100 further includes a first ink layer 151 and a second ink layer 152 disposed in the body 110. The first ink layer 151 is located on the first touch layer 130, and the second ink layer 152 is located between the first touch layer 130 and the second touch layer 140. The first ink layer 151, the first touch layer 130, the second ink layer 152, and the second touch layer 140 are stacked in the body 110, and the first touch layer 130 is located between the first ink layer 151 and the second ink layer 152. The first ink layer 151 and the second ink layer 152 may be used as a light shielding layer or a shielding layer. If a part of the body 110 is transparent, the first ink layer 151 and the second ink layer 152 may be used to shield the circuits or components inside the body 110.

On the other hand, the body 110 includes a first casing 101 and a second casing 102 disposed on the first casing 101. The first ink layer 151, the first touch layer 130, the second ink layer 152, and the second touch layer 140 are stacked between the second casing 102 and the first casing 101, and the controller 120 is disposed in the first casing 101. In detail, the first ink layer 151 is connected to an inner surface of the second casing 102, the first touch layer 130 is connected to the second casing 102 through the first ink layer 151, and the second touch layer 140 is connected to the first touch layer 130 through the second ink layer 152.

With reference to FIGS. 1A to 1C, in a preset mode, the first touch layer 130 and the second touch layer 140 are in a detection status to detect trigger events that occur in the different virtual touch regions. Before the first touch layer 130 and the second touch layer 140 are switched to a working status, the first touch layer 130 and the second touch layer 140 retain the ability to detect a touch, a slide or a tap on the second operating region 112, but the user still cannot operate or input information to the electronic device 100 through the second operating region 112. In other words, the detection status is similar to a wait/notify status to prevent an occurrence of accidental touch. Once the trigger events occurring in the different virtual touch regions are determined by the controller 120, the controller 120 controls the first touch layer 130 or the second touch layer 140 to switch from the detection status to the working status, so that the user may operate or input information to the electronic device 100 through the second operating region 112. Therefore, the electronic device 100 and its control method of the disclosure are quite user-friendly.

In the embodiment, the first touch region 112a and the second touch region 112b are virtual touch regions of the finger, and the first touch region 112a, the second touch region 112b, and the third touch region 112c are virtual touch regions of the stylus. When the trigger event occurs on the body 110, it is necessary to first determine in which of the virtual touch region the trigger event occurs, and to determine the type of the trigger event (Step S1).

For example, the trigger event may be roughly divided into a first trigger event and a second trigger event. The first trigger event is caused by the user's finger touching, sliding or tapping on the first touch region 112a or the second touch region 112b, and the second trigger event is caused by the stylus touching, sliding or tapping on the first touch region 112a, the second touch region 112b or the third touch region 112c.

If it is determined that the first trigger event has occurred on the second operating region 112, it represents that a specific touch behavior by the user's finger has occurred on any one of the first touch region 112a and the second touch region 112b, so one of the first touch region 112a and the second touch region 112b receives the touch signal and the specific touch behavior is detected by the first touch layer 130 in the detection status (Step S2). Then, the controller 120 controls the first touch layer 130 to switch from the detection status to the working status according to the touch signal, and keeps the second touch layer 140 in the detection status, so that the electronic device 100 switches to the first mode (Step S3). At this time, the user may touch, slide or tap on any one of the first touch region 112a and the second touch region 112b with a finger to operate or input information to the electronic device 100.

Taking the first touch region 112a as an example, when the first touch layer 130 in the detection status detects a specific touch behavior occurring on the first touch region 112a, the first touch region 112a receives the touch signal, and the controller 120 controls the first touch layer 130 to switch from the detection status to the working status according to the touch signal. At this time, the user may touch, slide or tap on the first touch region 112a with a finger to operate or input information to the electronic device 100. For example, the first touch region 112a may be used as a virtual touch pad to control a cursor in a display screen. On the contrary, if the first touch region 112a does not receive a touch signal within a specific time, the controller 120 controls the first touch layer 130 to switch from the working status to the detection status.

Taking the second touch region 112b as an example, when the first touch layer 130 in the detection status detects a specific touch behavior occurring on the second touch region 112b, the second touch region 112b receives a first touch signal. Then, the controller 120 controls the first touch layer 130 to switch from the detection status to the working status according to the first touch signal. At this time, the user may touch, slide or tap on the second touch region 112b with a finger to operate or input information to the electronic device 100. On the contrary, when the first touch layer 130 in the working status detects a specific touch behavior occurring on the second touch region 112b, the second touch region 112b receives a second touch signal. Then, the controller 120 controls the first touch layer 130 to switch from the working status to the detection status according to the second touch signal.

In the embodiment, the second touch region 112b is divided into a virtual key activation region 1121 and at least one virtual key region 1122, and the virtual key activation region 1121 is configured to receive the first touch signal or the second touch signal. Before the virtual key activation region 1121 receives the first touch signal, the first touch layer 130 remains in the detection status. Therefore, even if the user touches, slides or taps on the virtual key region 1122 with a finger, the user still cannot operate or input information to the electronic device 100. In other words, the virtual key activation region 1121 may be used to prevent the virtual key region 1122 from being accidentally touched.

After the first touch layer 130 is switched to the working status, the user may touch, slide or tap on the virtual key region 1122 with a finger to operate or input information to the electronic device 100. The virtual key region 1122 may be a hot key set by the manufacturer or customized by the user so as to improve the convenience of the user when operating the electronic device 100. When the first touch layer 130 in the working status detects a specific touch behavior occurring on the virtual key activation region 1121, the virtual key activation region 1121 receives the second touch signal. Then, the controller 120 controls the first touch layer 130 to switch from the working status to the detection status according to the second touch signal.

On the other hand, if it is determined that the second trigger event has occurred on the second operating region 112, it represents that a specific touch behavior by the stylus has occurred on any one of the first touch region 112a, the second touch region 112b, and the third touch region 112c, so one of the first touch region 112a, the second touch region 112b, and the third touch region 112c receives the electromagnetic signal and the specific touch behavior is detected by the second touch layer 140 in the detection status (Step S4). Then, the controller 120 controls the second touch layer 140 to switch from the detection status to the working status according to the electromagnetic signal, and keeps the first touch layer 130 in the detection status, so that the electronic device 100 switches to the second mode (Step S5). At this time, the user can touch, slide or tap on any one of the first touch region 112a, the second touch region 112b and the third touch region 112c through the stylus to operate or input information to the electronic device 100. On the contrary, if any of the first touch region 112a, the second touch region 112b, and the third touch region 112c does not receive the electromagnetic signal, the controller 120 controls the second touch layer 140 to switch from the working status to the detection status.

In addition, if any one of the first touch region 112a and the second touch region 112b does not receive the touch signal, and any one of the first touch region 112a, the second touch region 112b and the third touch region 112c does not receive the electromagnetic signal, the flow returns to the step of determining whether the first trigger event or the second trigger event has occurred on the body 110 (Step S1).

Other embodiments will be described below. The following descriptions will mainly focus on the differences among the embodiments, and the identical or similar parts will not be repeated.

Figure 2:
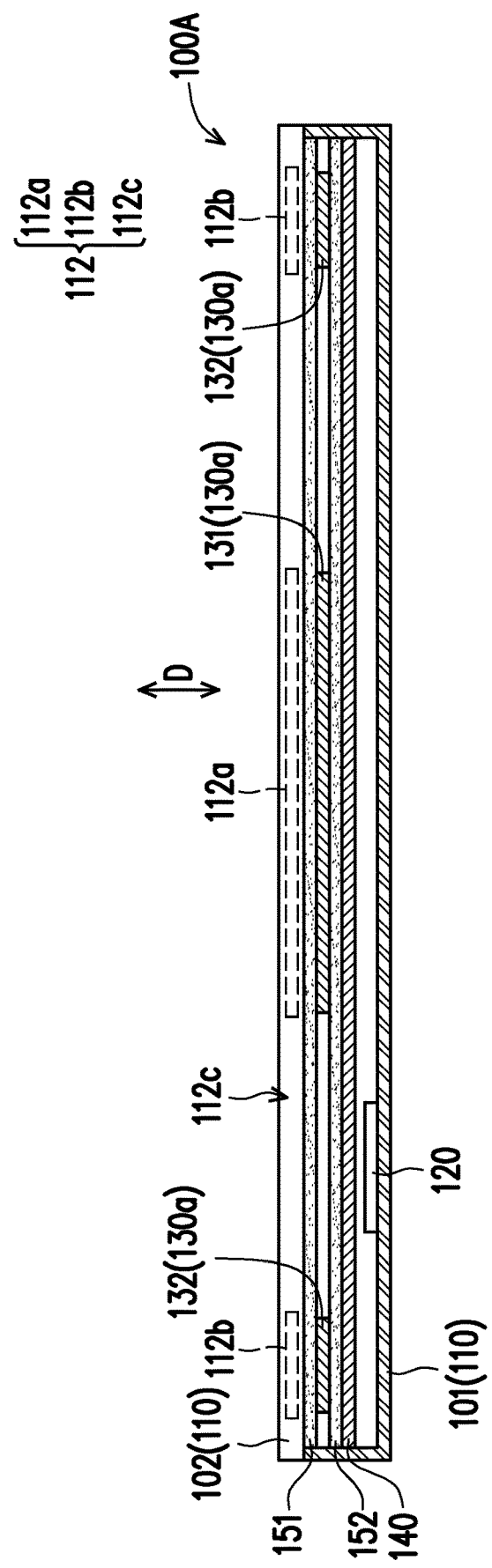
FIG. 2 is a cross-sectional schematic view of an electronic device according to a second embodiment of the disclosure.

FIG. 2 is a cross-sectional schematic view of an electronic device according to a second embodiment of the disclosure. With reference to FIG. 2, the difference between an electronic device 100A of this embodiment and the electronic device 100 of the previous embodiment lies in the design of the first touch layer. In this embodiment, a first touch layer 130a corresponds to the first touch region 112a and the second touch region 112b, and the first touch layer 130a includes a first touch part 131 and a second touch part 132 separated from each other. The first touch part 131 corresponds to the first touch region 112a, and the second touch part 132 corresponds to the second touch region 112b.

In detail, in the direction D perpendicular to the surface where the second operating region 112 is located, the first touch region 112a overlaps the first touch part 131, and the second touch region 112b overlaps the second touch part 132. On the other hand, directly below the third touch region 112c is a blank region between the first touch part 131 and the second touch part 132. As shown in FIG. 2, the surface area of the first touch layer 130a is substantially smaller than the surface area of the second operating region 112 and the surface area of the second touch layer 140. In the embodiment, the design of the first touch layer 130a helps to reduce manufacturing costs, reduce energy consumption, and prevent the occurrence of accidental touch.

Figure 3:
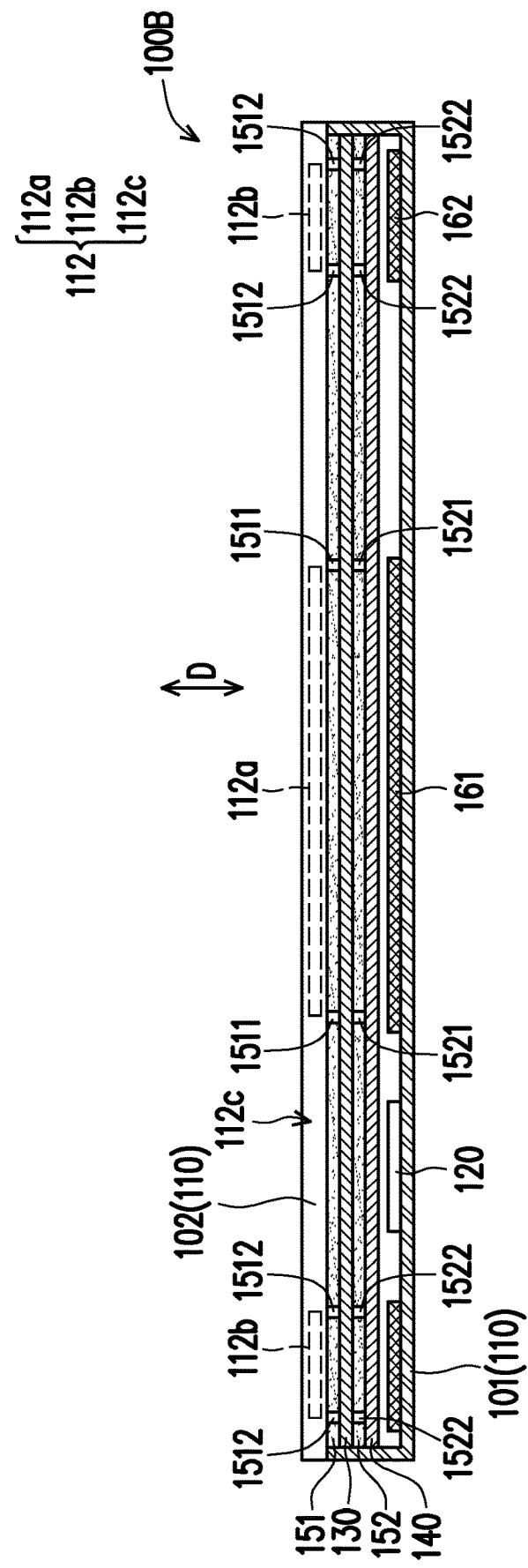
FIG. 3 is a cross-sectional schematic view of an electronic device according to a third embodiment of the disclosure.

FIG. 3 is a cross-sectional schematic view of an electronic device according to a third embodiment of the disclosure. With reference to FIG. 3, the difference between an electronic device 100B of this embodiment and the electronic device 100 of the previous embodiment lies in the material of the second casing, the design of the first and second ink layers, and the presence or absence of a backlight. In this embodiment, the second casing 102 includes a transparent material, the first ink layer 151 has a first transparent part 1511 corresponding to the first touch region 112a and a second transparent part 1512 corresponding to the second touch region 112b, and the second ink layer 152 has a first transparent part 1521 corresponding to the first touch region 112a and a second transparent part 1522 corresponding to the second touch region 112b.

In the direction D perpendicular to the surface where the second operating region 112 is located, the first transparent part 1511 of the first ink layer 151 overlaps the first transparent part 1521 of the second ink layer 152, and the second transparent part 1512 of the first ink layer 151 overlaps the second transparent part 1522 of the second ink layer 152. The first transparent part 1511 and the second transparent part 1512 may be slots or holes in the first ink layer 151, and the first transparent part 1521 and the second transparent part 1522 may be slots or holes in the second ink layer 152 for the backlight to project externally.

In this embodiment, the electronic device 100B further includes a first backlight 161 and a second backlight 162, and the first backlight 161 and the second backlight 162 are disposed in the body 110. In the direction D perpendicular to the surface where the second operating region 112 is located, the first backlight 161 corresponds to the first touch region 112a, and also corresponds to the first transparent part 1511 of the first ink layer 151 and the first transparent part 1521 of the second ink layer 152. The second backlight 162 corresponds to the second touch region 112b, and also corresponds to the second transparent part 1512 of the first ink layer 151 and the second transparent part 1522 of the second ink layer 152.

In the preset mode, the first backlight 161 and the second backlight 162 are disabled. If the user's finger has a specific touch behavior on any one of the first touch region 112a and the second touch region 112b, so that any one of the first touch region 112a and the second touch region 112b receives the touch signal, and the specific touch behavior is detected by the first touch layer 130 in the detection status, the controller 120 controls the first touch layer 130 to switch from the detection status to the working status according to the touch signal, and keeps the second touch layer 140 in the detection status, so as to switch the electronic device 100B to the first mode. On the other hand, the controller 120 enables any one of the first backlight 161 and the second backlight 162 according to the touch signal.

If the first backlight 161 is enabled, the light emitted by the first backlight 161 may pass through the first transparent part 1521 of the second ink layer 152 and the first transparent part 1511 of the first ink layer 151 and project externally to indicate the location, coverage range, or corresponding operating functions of the first touch region 112a, so as to help improve user convenience during operation. Furthermore, when the first touch layer 130 in the detection status detects a specific touch behavior occurring on the first touch region 112a, the first touch region 112a receives the touch signal, and the controller 120 enables the first backlight 161 and disables the second backlight 162 according to the touch signal. On the contrary, if the first touch region 112a does not receive the touch signal within a specific time, the controller 120 disables the first backlight 161.

If the second backlight 162 is enabled, the light emitted by the second backlight 162 may pass through the second transparent part 1522 of the second ink layer 152 and the second transparent part 1512 of the first ink layer 151 and project externally to indicate the location, coverage range, or corresponding operating functions of the second touch region 112b, so as to help improve user convenience during operation. Furthermore, when the first touch layer 130 in the detection status detects a specific touch behavior occurring on the second touch region 112b, the second touch region 112b receives the first touch signal, and the controller 120 enables the second backlight 162 and disables the first backlight 161 according to the first touch signal. On the contrary, when the first touch layer 130 in the working status detects a specific touch behavior occurring on the second touch region 112b, the second touch region 112b receives the second touch signal, and the controller 120 disables the second backlight 162 according to the second touch signal.

On the other hand, when a specific touch behavior of the stylus occurs on any of the first touch region 112a, the second touch region 112b and the third touch region 112c, any one of the first touch region 112a, the second touch region 112b and the third touch region 112c receives the electromagnetic signal, and is detected by the second touch layer 140 in the detection status. Then, the controller 120 disables the first backlight 161 and the second backlight 162 according to the electromagnetic signal, so that the electronic device 100B switches to the second mode.

Figure 4:
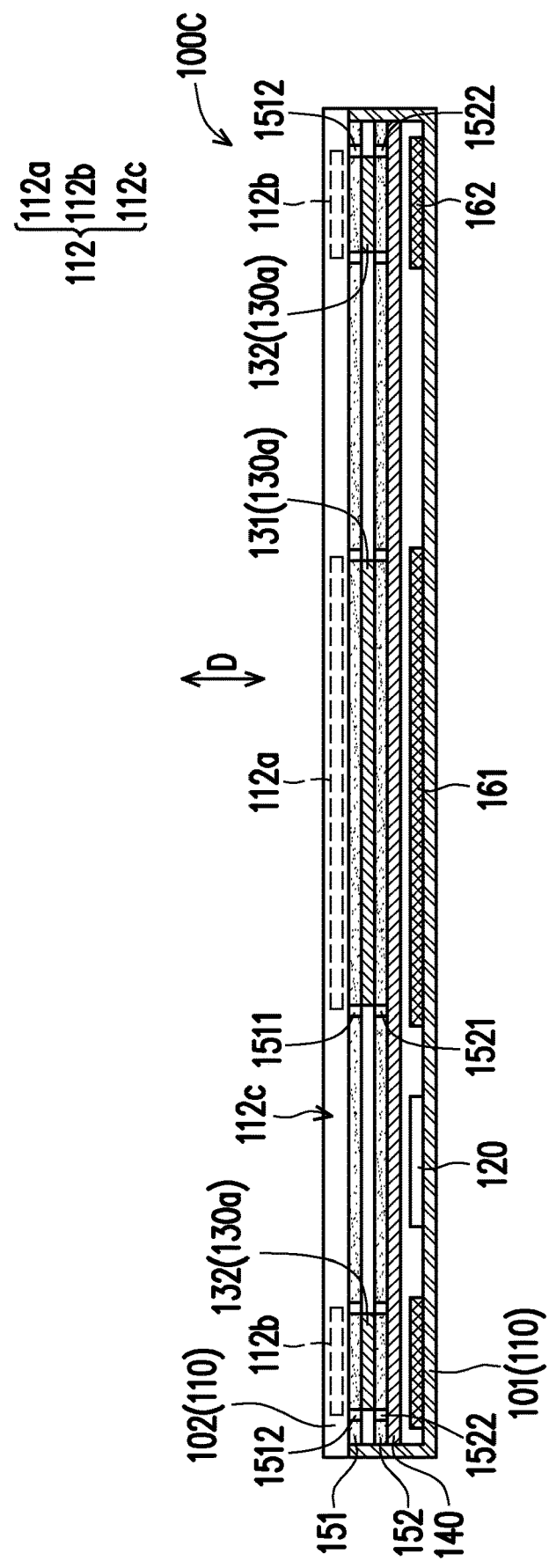
FIG. 4 is a cross-sectional schematic view of an electronic device according to a fourth embodiment of the disclosure.

FIG. 4 is a cross-sectional schematic view of an electronic device according to a fourth embodiment of the disclosure. With reference to FIG. 4, the design of an electronic device 100C of this embodiment is substantially the same as that of the electronic device 100B of the third embodiment, and the electronic device 100C uses the first touch layer 130a of the second embodiment.

In summary, in the electronic device of the disclosure, the first touch layer and the second touch layer are integrated in the body. The body has the first operating region and the second operating region, and the second operating region is divided into multiple virtual touch regions for a user to touch and for the electronic device to execute a corresponding function or action. In detail, the first touch layer is configured to sense a touch, slide or tap of the user's finger on the second operating region, and the second touch layer is configured to sense a touch, slide or tap of a stylus on the second operating region. Therefore, the electronic device of the disclosure not only has good integration, but also maintains the integrity of the product appearance. Once trigger events occurring in the different virtual touch regions are determined as having occurred by the controller, the controller controls the first touch layer or the second touch layer to switch from the detection status to the working status. Accordingly, the user may use at least one of the multiple virtual touch regions to operate or input information to the electronic device. Therefore, the electronic device and its control method of the disclosure are quite user-friendly.

It will be apparent to those skilled in the art that various modifications and variations can be made to the structure of the disclosure without departing from the scope or spirit of the disclosure. In view of the foregoing, it is intended that the disclosure covers modifications and variations of this disclosure provided they fall within the scope of the following claims and their equivalents.

What is claimed is:

1. An electronic device, comprising:
   a body, having a first operating region and a second operating region arranged side-by-side with the first operating region, wherein the second operating region is divided into a first touch region, a second touch region arranged side-by-side with the first touch region, and a third touch region located between the first touch region and the second touch region;
   a controller, disposed in the body;
   a first touch layer, disposed in the body, wherein the first touch layer corresponds to the first touch region and the second touch region, and the first touch layer is electrically coupled to the controller;
   a second touch layer, disposed in the body, wherein the first touch layer is disposed on the second touch layer, the second touch layer corresponds to the first touch region, the second touch region and the third touch region, and the second touch layer is electrically coupled to the controller;
   a first ink layer disposed in the body and located on the first touch layer; and
   a second ink layer disposed in the body and located between the first touch layer and the second touch layer, wherein the first touch layer is located between the first ink layer and the second ink layer, wherein
   in a first mode, the controller controls the first touch layer to switch from a detection status to a working status, and the second touch layer is in the detection status, and
   in a second mode, the controller controls the second touch layer to switch from the detection status to the working status, and the first touch layer is in the detection status.

2. The electronic device according to claim 1, wherein the first touch region is configured to receive a touch signal, the controller controls the first touch layer to switch from the detection status to the working status according to the touch signal, and if the first touch region does not receive the touch signal, the controller controls the first touch layer to switch from the working status to the detection status.

3. The electronic device according to claim 1, wherein the second touch region is configured to receive a first touch signal or a second touch signal, the controller controls the first touch layer to switch from the detection status to the working status according to the first touch signal, or controls the first touch layer to switch from the working status to the detection status according to the second touch signal.

4. The electronic device according to claim 1, wherein the second touch region is divided into a virtual key activation region and a virtual key region, the virtual key activation region is configured to receive the first touch signal or the second touch signal, the controller controls the first touch layer to switch from the detection status to the working status according to the first touch signal, or controls the first touch layer to switch from the working status to the detection status according to the second touch signal.

5. The electronic device according to claim 1, wherein any one of the first touch region, the second touch region and the third touch region is configured to receive an electromagnetic signal, the controller controls the second touch layer to switch from the detection status to the working status according to the electromagnetic signal, and if any one of the first touch region, the second touch region and the third touch region does not receive the electromagnetic signal, the controller controls the second touch layer to switch from the working status to the detection status.

6. The electronic device according to claim 1, wherein the first touch layer corresponds to the third touch region.

7. The electronic device according to claim 1, wherein the body comprises a first casing and a second casing disposed on the first casing, the first ink layer, the first touch layer, the second ink layer and the second touch layer are stacked between the second casing and the first casing, and the controller is disposed in the first casing.

8. The electronic device according to claim 7, wherein the second casing comprises a transparent material, and the first ink layer and the second ink layer each have a first transparent part corresponding to the first touch region and a second transparent part corresponding to the second touch region.

9. The electronic device according to claim 8, further comprising a first backlight and a second backlight disposed in the body and electrically coupled to the controller, wherein:
- the first backlight corresponds to the first transparent part of the first ink layer and the first transparent part of the second ink layer,
- the second backlight corresponds to the second transparent part of the first ink layer and the second transparent part of the second ink layer,
- in the first mode, the controller enables the first backlight or the second backlight, and
- in the second mode, the controller disables the first backlight and the second backlight.

* * * * *